Jan. 26, 1960 E. KRULL 2,922,334
SLIDE PROJECTOR WITH MECHANICAL FEED
Filed Feb. 21, 1956 2 Sheets-Sheet 1

INVENTOR
ERNST KRULL
BY Connolly and Hutz
ATTORNEYS

Jan. 26, 1960     E. KRULL     2,922,334
SLIDE PROJECTOR WITH MECHANICAL FEED
Filed Feb. 21, 1956     2 Sheets-Sheet 2

INVENTOR

ERNST KRULL

BY *Connolly and Hutz*

ATTORNEYS ature; United States Patent Office 2,922,334
Patented Jan. 26, 1960

2,922,334

SLIDE PROJECTOR WITH MECHANICAL FEED

Ernst Krull, Essen, Germany, assignor to Agfa Aktiengesellschaft, Leverkusen, Germany, a corporation of Germany Application February 21, 1956, Serial No. 566,948

Claims priority, application Germany March 1, 1955

7 Claims. (Cl. 88—28)

This invention relates to a slide projector including a mechanical slide-changing device for continuous sequential demonstration of lamellar diapositives, otherwise known as transparencies, from compartments of a storage container and return thereto; and more particularly to a projector of this type in which the storage container is intermittently advanced forward the distance of a compartment by a feed mechanism.

Various mechanical slide-changing devices have been adapted to slide projectors. In one of these known mechanical slide changers the storage container is supported on a T-shaped frame which is inserted through the projection aperture. A sliding frame is used to guide the individual transparencies into the projection aperture. The transparencies are inserted in compartments in a box-like storage container. The transparencies are slid from their compartments in pockets provided by the sliding frame into the projection position and then back into the compartment. A sliding bar is provided including a projection which moves the frame to and fro. In addition to the fact that the transparencies must be inserted into the pockets of the frame, there is another disadvantage in that the unbalanced weight of the compartment and the off-center actuation of the slide-changing lever tend to disturb the steadiness of the projector mounting. This very often causes the projected image to be displaced requiring frequent adjustment of the projector.

There are also mechanical slide-changing devices in which the storage container is mounted in a chamber in the side of the projector housing. This container has a slotted bottom and is rotated 90° when it is inserted for operation into the projector to turn the open top of the compartment toward the projector. Since the individual transparencies slide freely in their slots, or compartments, special care must be taken during rotation of the container so that the transparencies which may slip out of their compartment during rotation are moved carefully back into their original position in the compartment. Otherwise the cardboard frames of the transparencies may be broken. The arrangement of the storage container in the side of the housing also makes the housing relatively wide. In operation the back and forth movement of the transparency slider, which moves at an angle to the optical axis, tends to cause disturbing movement of the projector and image.

Finally there are known projectors of the type in which a transparency container is carried in a channel beneath the lamp housing. These transparencies are lifted into the position for projection by a sliding member or slider which passes through an opening in the container bottom. This slider is moved up and down by a slider-crank mechanism. This slider-crank mechanism engages in teeth provided on the bottom of the storage container and moves it forward the distance between compartments step-by-step. This type of construction requires a great deal of space under the lamp housing corresponding to the length of travel of the slider-crank mechanism, and this mechanism is also complicated and expensive. Since the base of the housing usually does not provide much clearance height, this mechanism must be positioned to move into a higher portion of the housing during certain portions of its operative cycle.

In accordance with this invention a projector including a mechanical slide-changing device is provided whose size inherently remains compactly within the limits of an ordinary projector housing, and in which the driving movement of the transparency slider occurs as close as possible to the optical axis. This inherently eliminates the application of unbalanced forces to the projector. The storage container is mounted in a channel beneath the lamp housing. The transparencies are lifted or raised by a slider which engages them through the slotted bottom-wall of the container. The transparencies are positioned in front of the projection aperture and then returned into their compartment in the container. The container is then moved forward by means of an actuating lever which moves the container forward a distance equal to a compartment. In accordance with this invention the slider is a curved steel band which is bent around a curved surface which is disposed at the front end of the projector housing. The turning point provided by the curved surface is preferably provided in the form of a roller. The driven end of the slider is thereby deflected at an angle to the plane of the transparency guide.

In this arrangement the portion of the steel band which moves to the upper end of the transparency guide is stiffened by being warped to form a curved cross section. Portions of the band on either side of the turning point may be so warped to be stiffened. In a simple embodiment of this invention, the driving end of the band, remote from the storage container, is joined to a driving mechanism by means of which this end of the band is moved in a substantially straight line to-and-fro in a direction parallel to the optical axis. This driving means can, therefore, be positioned parallel to the optical axis and it can, therefore, protrude through the rear wall of the projector base. A driving lever may be arranged, however, rotatably mounted on the walls of the projector. The slider can then be operated by a handwheel provided on the right or left side of the housing.

In another form of this invention, the end of the steel band lying on the driving side of the turning point can be wound upon a roller. This band can be wound on a roller which itself forms the turning point or another roller can be provided. In order to stiffen the band in its extended position, the slider is confined within the sides of a channel which is narrower than the unstressed width of the band. This makes the cross section of the band curved to greatly stiffen it.

In a useful example of this invention a single oscillating handwheel is provided for driving the slider and for moving the transparency container. An endless belt is provided within the housing rotating about a pair of rollers. The driving end of the band-shaped slider is fastened to this endless belt. This endless belt is driven back and forth by the rotatable handwheel which is coupled to a rigid lever whose remote end is attached to the upper portion of the endless belt.

Spring fingers are disposed to bear against the surface of the projection aperture. These springs are actuable to allow free entry of the transparency into the projection position. This permits free movement of the transparency into the exact predetermined position for projection. Means are provided for momentarily pressing the transparency firmly in contact with the surface of the projection aperture while a rotatable dimmer is swung out of the path of the light rays. The side of the dimming plate adjacent the projection aperture is extended past its pivot to press the spring against the transparency when the dimming plate is swung out of the path of the light rays. This dimming plate is coupled with a slotted sliding arm which is coupled to the dimmer by means of a connecting rod. The dimming plate is thereby rotated by lateral movement of the sliding arm.

A locking lever is provided for holding the storage container immovable during the act of raising and lowering each transparency. This locking lever has a flat upwardly bent end which engages teeth or slots provided in the bottom of the storage compartment. This locking lever includes a slanted surface on its rear end. The driving lever moves against this surface to drive the locking lever downward to disengage it from a tooth in the storage container to allow the storage container to move forward when the driving lever has retracted the slider. The flat upwardly bent end of a latch initially limits the forward movement of the storage container when it is inserted into the channel, and it also later actuates the container to provide successive positions of the storage compartments. A double-ended lever is rotatably mounted on the side wall of the housing. This double-ended lever carries the aforementioned latch which is rotatably coupled to its lower end. This latch includes a flat upwardly bent end which engages the teeth provided along the bottom of the storage container. This latch is moved to the tooth in back of the tooth engaged by the locking lever when the free end of the double-ended lever is actuated by movement of the driving lever in position to raise the transparency to its projection position. When the driving lever moves to restore the transparency to its compartment, it disengages the locking lever which permits the latch to be pulled forward by a spring to move the storage container forward the distance of one tooth which corresponds to the distance between transparencies or compartments.

The aforementioned rotating dimming plate may be eliminated by providing a dimming plate sliding in front of the projection aperture. This dimming plate may be formed, similarly to an iris diaphragm, of overlapping sliding strips which are coupled end to end.

This invention is basically independent of many of the aforementioned details. Instead of the sliding curved steel band moving to-and-fro within confining guides, a slider might be formed, for example, by narrow ribbons wound at an angle to the direction of movement in a manner similar to that provided in a roller window blind. These ribbons might be guided through the compartments of the storage container by U-shaped guide grooves provided in the side walls of the compartments.

Novel features and advantages of the present invention will become apparent to one skilled in the art from a reading of the following description in conjunction with the accompanying drawings in which.

Figure 1:
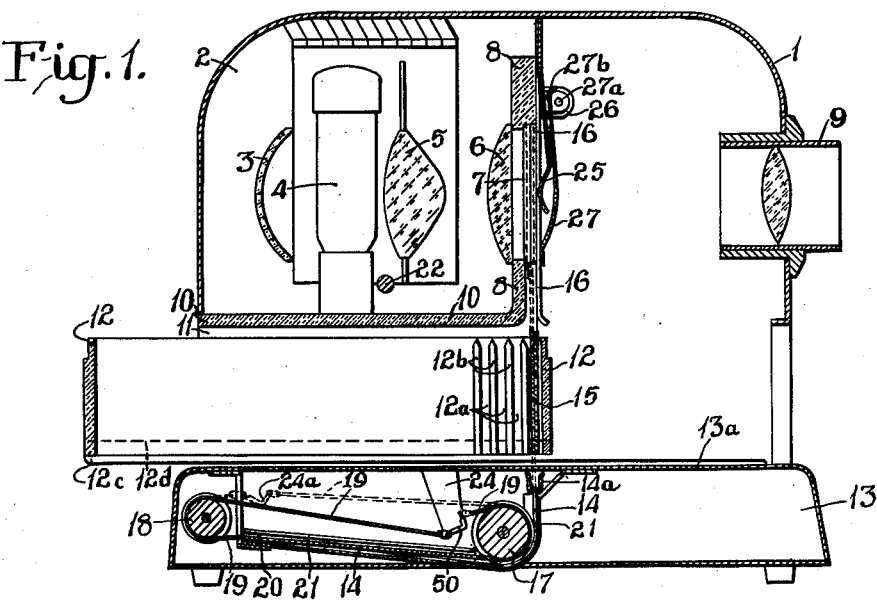
Fig. 1 is a cross-sectional view in elevation of one embodiment in this invention.

The housing 1 includes in the lamp chamber 2 an optical system. This optical system includes a reflector 3, a lamp 4, and condenser lenses 5 and 6, which are arranged behind the projection aperture 7 in the vertical wall 8. The objective lens 9 is subsequently positioned along the optical axis. A horizontal chamber 11 is provided under the horizontally positioned partition 10 of insulating material. This partition 10 in cooperation with vertical wall 8 segregates the lamphouse 2 accommodating the transparency container 12. The ends of chamber 11 are defined by two large openings in the housing 1. The storage container 12 rides parallel to the optical axis of lens 9 on a horizontal plate 13a which covers the housing foundation or base 13. The container 12, itself, has an open top so that transparencies can be inserted in vertical compartments 12a provided between ribs 12b on its longitudinal sidewalls. A longitudinal slot is provided running down the center of the container bottom 12c. This permits a fork-shaped end 14a of a slider 14, in each sequential position of the container 12, to push the transparency 15 lying above it upward into the projection position. Movement of the transparency is guided by the contacting front surface of the wall 8 and the guiding strips 16. Strips 16 are positioned away from wall 8 a distance slightly greater than the thickness of the transparency.

Figure 2:
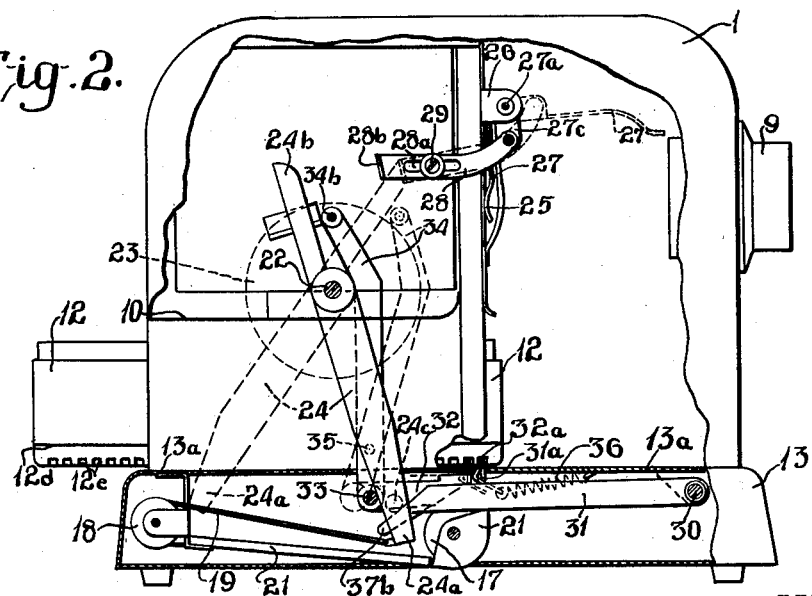
Fig. 2 is a view in elevation of the embodiment shown in Fig. 1 partially broken away.
Figure 3:
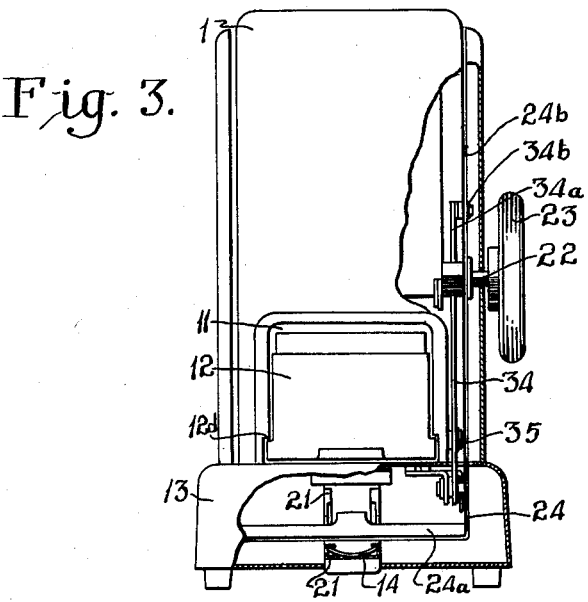
Fig. 3 is a rear view in elevation of the embodiment shown in Figs. 1 and 2.

The slider 14 consists of a flexible steel band, extended portions of which are slightly warped to provide stiffness. An endless belt 19 is looped about rollers 17 and 18. An end of the steel band 14 is fastened to the endless belt 19 at 20. Extended portions of the steel band 14 are confined within a channel 21, to warp it or bend its edges towards each other to form a C-shaped cross section. The stiffness of the band 14 is, therefore, only alleviated at the turning point provided by the curved surface of the roller 17. Movement of the slider 14 accordingly occurs by means of backward and forward movement of the endless belt 19. A bar or coupling 50 is provided on the upper traverse of the endless belt. This coupling 50 may be moved through a horizontal slot in the bottom of the housing base 13, or through a slot extending through the back wall of the base 13. In a preferred device, shown in Figs. 1, 2 and 3 a handwheel 23 is rotatably supported in a pivot 22 on the side wall of the housing 1 or on an inside wall which is parallel to it. This handwheel 23 is rigidly coupled to a lever 24 whose end 24a is joined to the upper traverse of the endless belt 19 by means of coupling 50. Lever 24 may be formed as a U-shaped frame rotatably mounted on both sides of the lamphouse to stably guide the coupling 50 to which the endless belt 19 is fastened. The elasticity provided by the endless belt absorbs the movement of lever end 24a on its curved path and transforms it to substantially straight reciprocating movement of the slider 14.

In front of the projection aperture 7 in the wall 8 in the zone where the two vertical edges of the lifted transparency 15 are positioned, two spring fingers 25 are fastened. These fingers 25 are shaped to press closely against the surface of the projection aperture. Dimming plate 27 is rotatably mounted on pin 27a which is held by bracket 26. The end 27b of this dimming plate 27 is extended past the axis 27a to contact the spring 25 when dimming plate 27 is swung upward out of the path of the light rays. This swung-out position is shown in broken line in Fig. 2. Springs 25 are thereby caused to press the lifted transparency 15 tightly against the appropriate surface of the projection aperture in wall 8. The rotation of this dimming plate 27 about the axis 27a takes place by means of a connecting rod 27c, coupled to a sliding arm 28 which is mounted on the housing by means of a screw and washer 29 inserted through slot 28a. The end 28b of the arm 28 is shaped at an angle to be contacted and moved by the extension 24b of the driving lever 24 which strikes it at the end of a stroke of the lever 24 when the transparency is lifted into its projection position. The dimming plate 27 opens against loading by a return spring not shown in the drawing. The base 12c of storage container 12 includes a laterally projecting flange 12d which engages a groove (not shown) to prevent it from rising. A rack of square-toothed gearing provides a series of teeth 12e on the bottom of the storage container 12. These teeth are positioned apart the distance between transparencies in their compartments. A locking lever 31 is rotatably mounted about a shaft 30 fixed in the base 13 of the housing. Locking lever 31 includes an upward turned flat end or extension 31a. This projection 31a engages the successive teeth of the storage container to arrest its travel as it moves through the housing. This locking lever 31 is urged upward into the locking position by means of a spring (not shown). One, therefore, can push the container 12 forward until the first transparency 15 is automatically positioned over the slider 14 by means of latch 32 (later described). The end 31a remains engaged in the tooth until it is rotated downward by contact of the roller 24c of the driving lever 24 on the slanted surface 31b on the end of lever 31. Driving lever 24 disengages end 31a of lever 31 from a tooth 12e when the lower end of lever 24 is thrust forward moving the forked end 14a of slider 14 down and out of the path of movement of storage container 12 thereby restoring the transparency to its compartment. Complete safety of operation is, therefore, assured because the storage container is not unlocked unless slider 14 is fully retracted out of the path of its forward movement.

A spring-operated push latch 32 is rotatably mounted about a pin at the bottom of double-ended lever 34. This double-ended lever 34 is rotatably mounted about a pin 35 which is fixed in a vertical side wall of the housing. The upper end 34a of lever 34 terminates with a roller 34b which projects into the path of movement of the end 24b of driving lever 24. The free end 32a of the latch 32 slants upward to engage the teeth 12e at an angle to permit latch 32 when moved backward to momentarily overcome the forward pull of tension spring 36 and ride over a tooth 12e and engage in the next tooth space. Slanted end 32a also arrests the first tooth of the storage container as it is inserted into the housing automatically position the first transparency 15 over the slider 14. The container 12 and the spring loaded lever 32 remain blocked in this locked position by upwardly bent extension 31a which remains engaged in the initial tooth space until after the retraction of the slider 14 by driving lever 24. When the roller 24c of driving lever 24 drives end 31b of the locking lever 31 downward to withdraw locking extension 31a from this initial tooth-space, this permits latch 32 to be pulled forward by the spring 36 thereby moving the storage container forward the distance of one tooth or compartment. The next transparency is thereby placed into position for raising and projection.

What is claimed is:

1. A slide projector for continuous sequential demonstration of transparencies from compartments of a storage container by means of a slider mechanism which contacts the transparencies through slots in a side of said container which is intermittently advanced, said slider mechanism comprising a flexible band, a curved surface mounted in the projector housing and positioned in the path of movement of said slider, said flexible band turning a corner about said curved surface from its substantially longitudinal path of movement through said housing to its relatively substantially perpendicular path of movement through a compartment of said storage container, channel means confining the portion of said band extending through said storage compartment to warp it in cross-section to stiffen said portion of said band, a shoe for engaging transparencies fastened to the end of said band passing through storage compartment, translating means coupled to the end of said steel band remote from said storage container for imparting movement to said remote end of the flexible band for removing transparencies from said storage compartments into position for projection and subsequent return to said storage compartment, said flexible band being confined within said channel means on both sides of said curved surface, an endless belt rotatably mounted in said projector housing adjacent the path of movement of the end of said flexible band remote from said storage container, attaching means fastening said end of said flexible band to a point on said endless belt to guide and cause the backward and forward movement of said portion of said flexible band, driving lever rotatably mounted on a wall of said projector housing, said endless belt including a coupling means, an end of said lever being joined to said coupling means to provide backward and forward motion of said endless belt to reciprocate said attached slider, a manually operable means joined to said lever to allow said lever to be easily moved backward and forward by hand, said projector housing including a front wall including a projection aperture, a pair of spring fingers contacting the surface of said projection aperture, an end of each of said spring fingers being secured to said wall, a rotatable dimmer plate being hinged to said wall adjacent the hinged end of said spring fingers, said dimmer plate including an extension for contacting a portion of said spring fingers for firmly pressing said spring fingers against a transparency raised in projection position against said surface of said projection aperture, said dimmer plate being coupled to a sliding arm by means of a connecting rod, said sliding arm including a slot, said slotted portion of said sliding arm being loosely mounted upon said projector housing by pin means passing through said slot, and said sliding arm being disposed in the path of movement of an end of said driving lever to cause said dimmer plate to be raised and said spring fingers to be pressed against a raised transparency when said driving lever has been rotated in position to move said slider in position to move a transparency into the projection position.

2. A projector as set forth in claim 1 wherein a series of teeth are provided in a side of said storage container, said teeth being spaced apart the distance between transparencies in said compartments, a locking lever is rotatably mounted in the base of said housing, said locking lever includes an extension for engaging said teeth, said locking lever also including an actuating surface, said driving lever including a projection for contacting said actuating surface to drive said locking lever downward to designate said extension from said teeth to permit said storage container to be driven forward when said driving lever has rotated said flexible band into its retracted position clear of the path of movement of said storage container.

3. A projector as set forth in claim 2 wherein a double-ended lever is rotatably mounted upon said housing, a push latch is rotatably coupled to the lower end of said double-ended lever, said latch includes a bent extension for engaging said teeth, a tension spring anchored to said housing and secured to the end of said latch to draw said latch in a forward direction, said latch bent extension being shaped to permit said latch to be drawn backward from the tooth engaged by said locking lever to the adjacent tooth, said double-ended lever including a projection at its upper end lying in the path of movement of the upper end of said driving lever for moving said latch backward the distance of one of said teeth when said driving lever is rotated to cause said slider to raise a transparency into said projection position, and said tension spring drawing said push latch forward to advance said storage container the distance of one tooth when said locking lever is disengaged from the adjacent tooth by rotation of said driving lever to its position to retract said slider and restore said transparency to its compartment.

4. A slide projector for continuous sequential demonstration of transparencies from compartments of a storage container by means of a slider mechanism which contacts said transparencies through slots in a side of said container, said slider mechanism comprising a flexible band, a curved surface mounted in the projector housing and positioned in the path of movement of said slider, said flexible band turning a corner about said curved surface from its substantially longitudinal path of movement through said housing to a path of movement disposed substantially perpendicular thereto and passing through a compartment of said storage container, channel means confining the portion of said band extending through said storage compartment for warping it in cross-section to stiffen said portion of said band, a shoe for engaging transparencies fastened to the end of said band passing through said storage compartment, translating means coupled to the end of said flexible band remote from said storage container for imparting substantially longitudinal movement to said flexible band for removing transparencies from said storage compartments into position for projection and subsequent return to said storage compartment, a movable control means mounted upon said projector housing, connecting means operatively coupling said movable control means to said translating means, a series of teeth provided upon a side of said storage container, said teeth being spaced apart a distance corresponding to the distance between transparencies in said compartments, a locking lever movably mounted within said housing, said locking lever including an extension for engaging said teeth, coupling means operatively engaging said movable control means with said locking lever and being constructed and arranged for disengaging said extension from said teeth when said movable control means has moved said flexible band into its retracted position clear of the path of movement of said storage container to permit said storage container to be driven forward to the position for removing and demonstrating the next transparency, said movable control means comprising a driving lever, a double-ended lever being rotatably mounted upon said housing, a push latch being rotatably coupled to the lower end of said double-ended lever, said latch including a bent extension for engaging said teeth, a tension spring anchored to said housing and secured to the end of said latch to draw said latch in a forward direction, said bent extension being shaped to permit said latch to be drawn backward from the tooth engaged by said locking lever to the adjacent tooth, said double-ended lever including a projection at its upper end lying in the path of movement of the upper end of said driving lever for moving said latch backward the distance of one of said teeth when said driving lever is rotated to cause said slider to raise a transparency into said projection position, and said tension spring drawing said push latch forward to advance said storage container the distance of one tooth when said locking lever is disengaged from the adjacent tooth by rotation of said driving lever to a position at which it retracts said slider and restores said transparency to its compartment.

5. A projector as set forth in claim 4 wherein said flexible band is confined within said channel means on both sides of said curved surface.

6. A projector as set forth in claim 4 wherein an endless belt is rotatably mounted in said projector housing adjacent the path of movement of the end of said flexible band remote from said storage container, attaching means fastening said end of said flexible band to a point on said endless belt to guide and cause the backward and forward movement of said portion of said flexible band.

7. A projector as set forth in claim 6 wherein a driving lever is rotatably mounted on a wall of said projector housing, said endless belt including a coupling means, an end of said lever being joined to said coupling means to provide backward and forward motion of said endless belt to reciprocate said attached slider, and a manually operable means joined to said lever to allow said lever to be easily moved backward and forward by hand.

References Cited in the file of this patent

UNITED STATES PATENTS

| 594,819 | Allen | Nov. 30, 1897 |
| 1,624,098 | Goldsmith et al. | Apr. 12, 1927 |
| 2,132,716 | Wittel | Oct. 11, 1938 |
| 2,276,935 | Como | Mar. 17, 1942 |
| 2,401,506 | Pechkranz | June 4, 1946 |
| 2,528,325 | Valpey | Oct. 31, 1950 |
| 2,579,281 | Tuck | Dec. 18, 1951 |

FOREIGN PATENTS

| 347,782 | France | Jan. 17, 1905 |
| 408,237 | France | Jan. 19, 1910 |